March 1, 1949.  E. C. STEINER  2,463,438
GAUGE FOR BAND SAWS OR THE LIKE
Filed Oct. 12, 1946
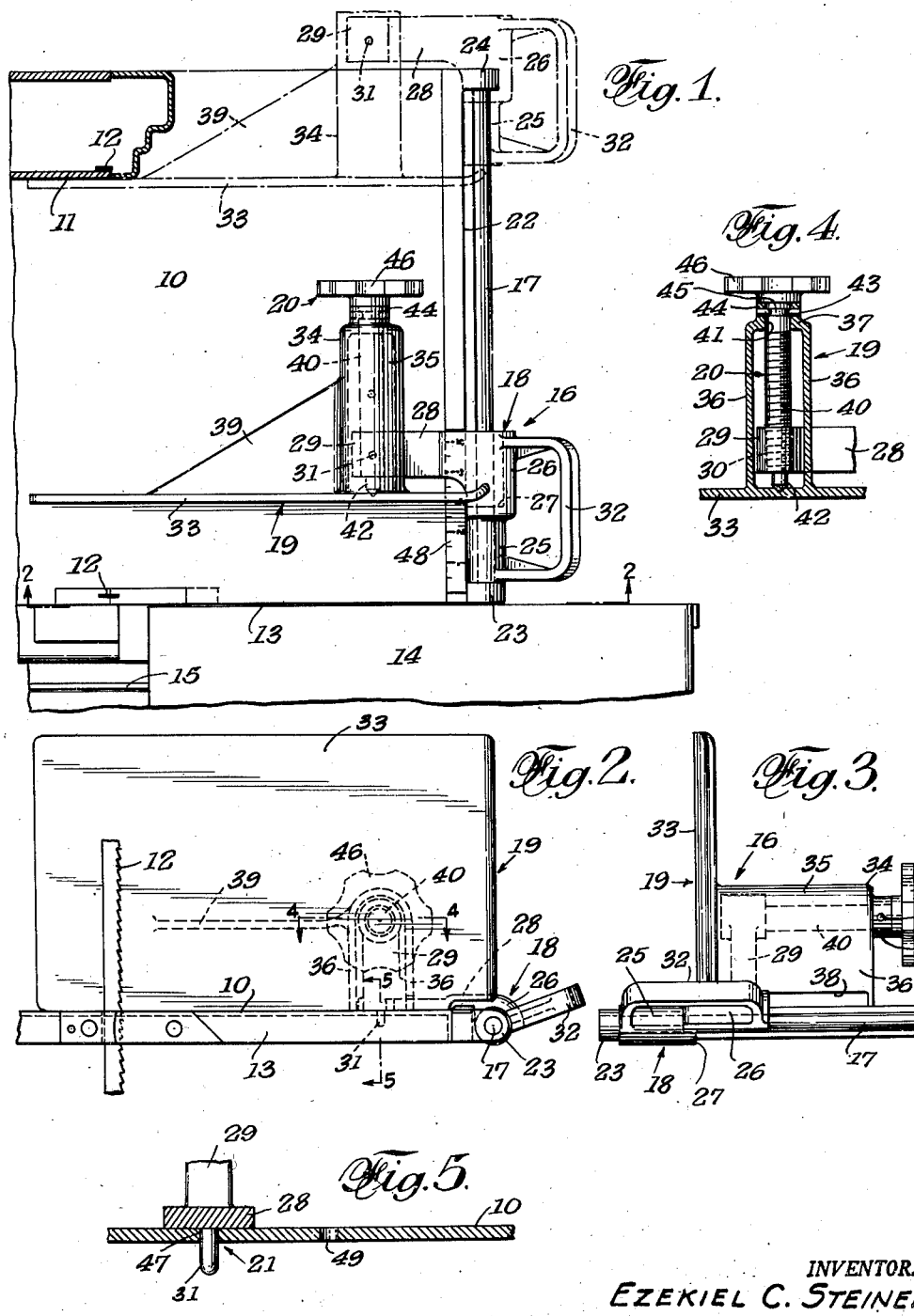
INVENTOR.
EZEKIEL C. STEINER
BY
Hyman Jackman
ATTORNEY Patented Mar. 1, 1949

2,463,438

UNITED STATES PATENT OFFICE 2,463,438

GAUGE FOR BAND SAWS OR THE LIKE

Ezekiel C. Steiner, Los Angeles, Calif.

Application October 12, 1946, Serial No. 702,979

1 Claim. (Cl. 143—174)

This invention relates to gauges for guiding material in operative relation to a cutter and deals more particularly with a gauge for a band saw especially designed for use by butchers to cut meat and bones.

An object of the present invention is to provide a simple and effective low cost gauge adapted to be adjusted with respect to a saw band or the like and to be readily moved from gauging or operative position when unimpeded use of the support or operating table is desired.

Another object of the invention is to provide a gauge which has one or more fixed positions with relation to a cutter, which carries a gauge plate adjustable toward and from the cutter, which by a simple tilting of the gauge, bodily, is adapted to be moved to a remote point with respect to the cutter, and which is readily restored to one of its fixed positions without disturbing the adjusted position of the gauge plate.

Another object of the invention is to provide simple yet effective locating means for a gauge of the type indicated in which expensive movable elements such as latches and the like are obviated and in which said locating means are positive in operation and effective by simply tilting the gauge bodily into and out of located position.

The invention also has for its objects to provide means of the character indicated that are positive in operation, convenient in use, easily installed in working position, and easily disconnected therefrom, economical to manufacture, relatively simple, and of general superiority and serviceability.

The invention also comprises novel details of construction and novel combinations and arrangements of parts, which will more fully appear from the following description. However, the drawing and the description serve to disclose only one embodiment of the present invention which is given as by way of example only.

In the drawing:

Fig. 1 is a top plan view, partly broken, of the operating table of a band saw and showing a gauge according to the invention in operative position, said gauge, in dot-dash lines also being shown in retracted or non-operative position.

Fig. 2 is a front view thereof as seen along the line 2—2 of Fig. 1.

Fig. 3 is a side view of the gauge in operative position.

Fig. 4 is a broken cross-sectional view as taken on the line 4—4 of Fig. 2.

Fig. 5 is an enlarged fragmentary sectional view as taken on line 5—5 of Fig. 2.

The machine on which the gauge is mounted is shown as a band saw for the use of butchers. Typically, such a machine has a fixed operating table 10 from which upwardly projects a hollow column 11. A saw band 12 is trained about pulleys (not shown) above and below the table 10 so that its cutting run passes through the table at or near its front edge 13 and its return run is located in the hollow of the column 11. Also, typically, a table 14, movable on guide means 15, is provided as a forward extension of the table 10 and said table 14 is freely movable from side to side of the machine. By placing the material to be cut by the band 12 on the table 14 and abutting it against the gauge 16, that portion of said material which rests on the table 10 is sliced cut away from the bulk of the material by moving the table in a direction toward the band 12. Upon retraction of the table 14 and moving the remainder of the material into abutment with the gauge, a second slice may be cut, etc. The foregoing is generally conventional and discloses one type of machine adapted for the gauge 16.

The gauge 16 comprises, generally, a guide bar 17, a body 18 mounted on said bar for sliding movement therealong, a gauge plate 19, means 20 for moving the gauge plate relatively to the body 18, and means 21 for locating the body in fixed operative position on the table and with respect to the band 12.

The bar 17, as shown, is placed parallel to and spaced from the side edge 22 of the table 10. Said bar is preferably round and is mounted between front and rear ears or lugs 23 and 24, respectively, at the respective front and rear edges of the table 10.

The body 18 comprises a cast member formed with a tubular portion 25 mounted on the bar 17 for movement therealong and also for relative rotation thereon. A rearward enlarged extension 26 of the tubular portion 25 is formed to pass over and beyond the ear or lug 24 and has an abutment 27 for engaging said lug and thereby limiting the retracted position of the body as shown by the dot-dash lines of Fig. 1. In the operative position of the gauge, the forward end of the body portion 25 may abut the ear or lug 23. In this manner, the gauge is limited for sliding movement between the lugs 23 and 24.

A lateral extension 28 from the rear of the extension 26 is formed with an upper extension 29 and the latter is provided with an internally threaded bore or passage 30. Near the outer end of the extension 28 there is provided a downwardly directed portion which is shown as a pin 31.

The body, for convenience of operation, is provided with a handle 32 which extends laterally and somewhat upwardly.

The gauge plate 19, also a casting, is formed with a plate portion 33 having a rearward hollow extension 34. Said extension is formed as a hollow portion having a semi-tubular top part 35, depending side or skirt parts 36, and an end wall 37 parallel to the plate portion 33.

The gauge plate 19 is adapted to be mounted on the body 18 by placing the same so that the extension 29 resides in the hollow of the extension 34 with the lower edges of the skirt parts 36 resting on the table 10. A clearance slot 38 is provided for the lateral extension 28. A fin or web 39 is provided to reinforce the gauge plate between the plate portion 33 and the extension 34.

The means 20 comprises a threaded stem which extends through a bore 41 in the wall 37, is threadedly engaged in the threaded bore 30, and has a reduced portion 42 engaged in a seat formed in the rear face of the plate portion 33. A pin or pins 43 is radially directed through a boss 44 on wall 37 to engage in an annular groove 45 in the stem 40 and thereby hold said stem against endwise movement in the gauge plate 19. A knob handle 46 is provided on the stem for effecting rotation thereof.

The table 10 is provided with at least one hole 47 in line with the pin 31 and so located with respect to the saw band 12 as to locate the body 18 in desired relation. If desired one or more additional holes 49 may be provided in the table for selective reception of the pin 31.

As shown at 48, a graduated scale may be associated with the front face of the plate portion 33 and said scale may advantageously be located at or near the table edge 22.

In use, the gauge body is located as shown, with the pin 31 in either the hole 47 or the hole 49. By turning the knob 46, the plate portion 33 of the gauge is moved forward or rearward with relation to the saw band 12 and a desired setting, therefore, is obtained as ascertained by reading the scale 48. Meat slicing and similar operations may now be performed as above set forth. When it is desired to remove the gauge for cutting operations on large items such as sides of beef, the handle 32 is depressed to extract the pin 31 from the hole 47 or 49. This simple tilting of the gauge 16, bodily, frees said gauge from engagement with the table and permits it to be slid along the bar 17 to the retracted position shown. The relative setting of the body 18 and the gauge plate 19 is not disturbed so that the gauge 16 can then be restored to its operative position and slicing, as described, continued.

It will be evident that the device exemplifying the present invention is extremely simple, has few relatively movable parts, and is entirely fool-proof in operation. Unless the pin 31 is in one of the holes provided for it, the plate portion 33 will be tilted from its normal position resting on the table 12 to give visual evidence that the gauge is improperly located. However, once the pin 31 is seated, full assurance is had that the gauge is ready for efficient use.

While I have illustrated and described what I now regard as the preferred embodiment of my invention, the construction being subject to modification, I do not wish to restrict myself to the particular form of construction disclosed, but desire to avail myself of such modifications that may fall within the scope of the appended claim.

I claim:

In a machine having a cutter, a table associated with the cutter and having two holes in the face thereof offset from the cutter and aligned adjacent one edge of said table, and a slide bar spaced from and parallel to said table edge; a gauge assembly comprising a body mounted to slide and rotate on said bar and formed with an extension having overstanding relation to the table, a downwardly directed pin on said extension for selective engagement in said two holes to locate said body, selectively, nearer to and further from the cutter, there being an outwardly directed integral handle on said body adapted to be depressed to partially rotate said body on the slide bar to remove said pin from the hole into which it projects, said handle affording means for sliding the body to align said pin with the other of the two holes, an upwardly extending integral and internally threaded boss on the end of said extension, said gauge assembly further including a gauge integrally comprising an elongated hollow part to receive said boss and a gauge plate extending transverse to the slide bar, and an adjustable threaded stem carried by and extending longitudinally through said hollow part and engaged with the threaded boss for adjusting the gauge plate with respect to the selected position of the gauge body and with respect to the cutter.

EZEKIEL C. STEINER.

REFERENCES CITED

The following references are of record in the file of this patent:

UNITED STATES PATENTS

| Number | Name | Date |
| --- | --- | --- |
| 305,563 | Baer | Sept. 23, 1884 |
| 536,651 | Potter | Apr. 2, 1895 |
| 1,459,873 | Blackburn | June 26, 1923 |
| 1,574,445 | Robinson | Feb. 23, 1926 |
| 2,280,621 | Biro | Apr. 21, 1942 |
| 2,310,813 | Sellmeyer | Feb. 9, 1943 |
| 2,374,286 | Hargadon | Apr. 24, 1945 |
| 2,380,700 | Lesar | July 31, 1945 |